Jan. 23, 1968  K. MacGREGOR SWANSON ET AL  3,365,372
TUBULAR NUCLEAR FUEL RODS

Filed May 5, 1966  2 Sheets-Sheet 1

United States Patent Office 3,365,372
Patented Jan. 23, 1968

3,365,372
TUBULAR NUCLEAR FUEL RODS
Kenneth MacGregor Swanson, Thurso, Caithness, Scotland, and John A. Gatley, Appleton, Warrington, England, assignors to United Kingdom Atomic Energy Authority, London, England
Filed May 5, 1966, Ser. No. 547,924
Claims priority, application Great Britain, May 11, 1965, 19,913/65
6 Claims. (Cl. 176—68)

ABSTRACT OF THE DISCLOSURE

Fuel pins for packing as a cluster in an assembly wrapper (as in FIGURE 4) are of tubular form. This form results from inner and outer sheaths having fuel between them. In order that gas released from the fuel in service may be vented to the immediate surroundings an extension of one of the sheaths forms a narrow gap around the other sheath and fixing of the sheaths together is confined to a single region remote from the vent gap thereby allowing differential thermal expansion of the sheaths.

---

The present invention relates in general to nuclear reactor fuel assemblies composed of clustered nuclear fuel rods; it is concerned more specifically with tubular nuclear fuel rods having inner and outer sheaths with nuclear fuel contained between them, such fuel being preferably ceramic.

Ceramic fuel tends to be less retentive of fission product gases than metallic or cermet fuels. The proportion of these gases which are released from ceramic fuel is strongly temperature dependent. Current evidence points in the direction of there being some threshold temperature below which the release is small enough to be of little significance and above which the release is so considerable that it is conveniently assumed to be complete.

Released fission product gases build up pressures in sheathing of the sealed type and this build up becomes a limitation on the irradiation life of the fuel assembly. Void lengths can be added to the fuel rods to act as gas storage space and so delay the pressure build up but such addition increases the pressure drop across the reactor core of the coolant which is forced therethrough and, by extending the core axially, may detract from the compactness of the reactor installation.

Suppression of gas release from ceramic fuel entails that the design maximum fuel temperature at full load operation is limited with regard to the threshold temperature referred to above. For limiting the fuel centre temperature, the cross sectional area of fuel in the rods may be made small, either by using a small outer diameter for solid cylindrical fuel or by using so-called hollow fuel which is typically of annular shape, possibly with a non-fissile refractory filling. These expedients tend to augment at the expense of the fuel those volume fractions of the core composition which are least useful, namely the structural and voidage fractions.

Tubular fuel, as distinct from hollow fuel, allows coolant flow inside the rod as well as outside and is analogous to a sheathed fuel plate formed into a closed shape. Since the fuel thickness can be easily limited in the tubular construction, this construction has been regarded hitherto as a convenient means of limiting the maximum fuel temperature or so called "centre temperature." There is now contemplated herein the use of ceramic fuel in a tubular rod which is vented. The feature of being vented means that gases released by the fuel are allowed to escape to the immediate surroundings i.e. the interior of a vessel enclosing the reactor core; this is in contrast to sheathing of the sealed type.

Since venting removes the pressure build up of released fission product gases, the previously discussed limitation of centre temperature is no longer necessary in tubular fuel and the choice of dimensions need only be restricted by considerations of fuel melting. This largely unrestricted choice affords room for increased heat output ratings and fuel sections of increased size. Voidage is also unnecessary, and therefore the voidage volume fraction of the core composition, as also the structural fraction, can be cut to a minimum with consequent gain in the fuel fraction.

As a suitable construction for the use herein contemplated, the invention provides a tubular nuclear fuel rod having inner and outer sheaths with nuclear fuel contained between them, in which one of the sheaths has a termination co-operating in axially slidable relationship with the other sheath to provide along the opposing wall surface of the latter a vent path to the exterior of the fuel rod for gases released from the fuel, and in which the sheaths are rigidly fixed together only in one region of the rod remote from the aforementioned sheath termination so as to allow differential thermal expansion of the sheaths in the axial direction of the rod. It will be appreciated that the introduction of the vent between the sheaths in this way serves the dual purpose of venting the released gases and confining the fixing together of the sheaths to one region, preferably the opposite end of the rod, so that differential thermal expansion is permissible. Of course there may be added transverse location of the sheaths as by spacers arranged in the interspace, the engagement with at least one of the sheaths being slidable.

Also the invention provides a tubular nuclear fuel rod as above set forth but with the termination of the one sheath having freedom to move axially of the other and defining therewith a clearance which is narrower than the separation between the sheaths where the fuel is disposed.

This construction of tubular fuel rod in accordance with the invention can be extremely simple; in its simplest form either the inner sheath is flared, or the outer sheath is pinched, to produce as the termination a free edge which is unconnected with the other sheath. Clearance pertaining at this edge need not be uniform; it may even be discontinuous, as in the case of projections on one of the surfaces being provided to engage the opposite surface for purposes of transverse location. It may be desirable, especially with fuel containing plutonium which gives rise to alpha radiation, that the rod is manufactured with a thermally destructible seal closing the vent path. Conveniently this seal would be of a low melting point solder. Heating of the rod in service in a reactor core is then relied upon to remove the seal automatically.

The invention will be further described with reference to an embodiment designed for service in a liquid cooled nuclear reactor core, more specifically a fast reactor cooled by a low melting point metal assumed for the purposes of the present example to be sodium. The relevant features of this embodiment, which is taken by way of example only, are illustrated in the accompanying drawings, in which.

Figure 1:
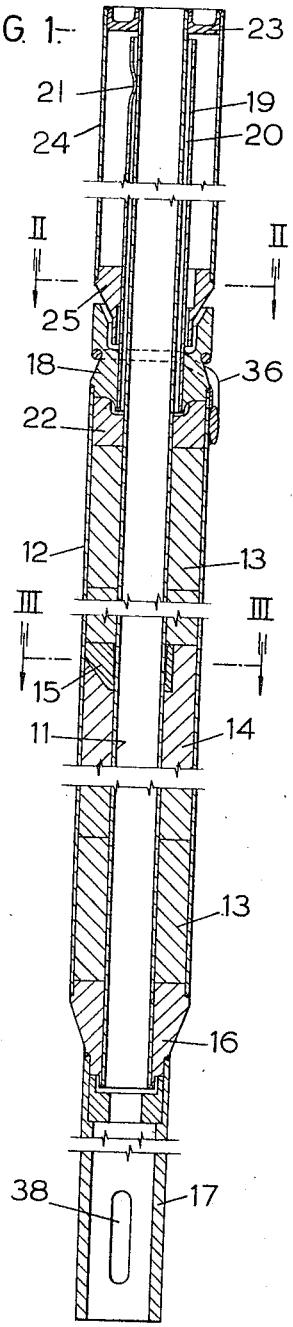
FIGURE 1 is a view in longitudinal section of a type of rod which by virtue of its elongated slender form is more commonly referred to as a "fuel pin,"
Figure 3:
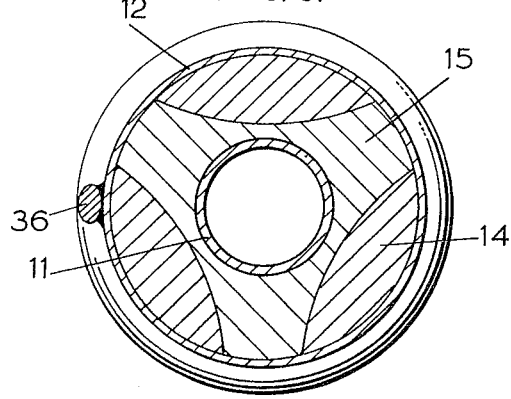
FIGURE 3 is a cross-section taken on the line III—III of FIGURE 1.

In the fuel pin of FIGURE 1, stainless steel inner and outer sheaths in the form of coaxial thin-walled tubes are denoted 11 and 12 respectively. The separation between these sheaths forms an annular space which contains a filling constituted by pellets, such as 13, of breeder fuel at the upper and lower ends and a length of particulate enriched fissile fuel 14 extending between these upper and lower breeder sections. It is assumed herein that the enriched fissile fuel is in a ceramic form, for example, a mixture of the dioxides of uranium and plutonium, of which the particles are compacted to a preselected percentage of the theoretical density. At 15 there is indicated a molybdenum fuel end spacer which is also seen in FIGURE 3, this spacer being brazed or otherwise rigidly connected to the inner sheath 11 but slidably engaged with the outer sheath. An identical end spacer is interposed between the lower breeder section and the fuel length, and similar spacers are introduced at intervals within the length of fuel itself.

At their lower ends the sheaths are rigidly fixed together by welding to a bottom end cap 16. This end cap carries a downwardly projecting locating tube 17 through the hollow interior of which a flow of coolant can reach the inside of the inner sheath.

Towards the upper end of the outer sheath 12 there is a flange-like connecting piece 18, otherwise referred to as a top end cap, which serves to connect the outer sheath to an extension piece 19 in the form of a uniform section length of thin-walled cylindrical stainless steel tube having a smaller diameter than the outer sheath. This extension piece embraces the inner sheath 11 whilst leaving a small vent clearance 20. Through this clearance it will be seen that the annular space between the sheaths containing the fuel material has communication with the exterior of the fuel pin. In order to provide some transverse location of the extension piece 9 it is dimpled inwardly, as at 21, at three circumferentially equispaced locations, such projections making engagement with the inner sheath. Interposed between the top breeder section 13 and the top end cap 18 is a stainless steel knitmesh filter 22. It will be noted that, with the exception of the extension piece 19, the inner and outer sheaths are of uniform cylindrical section over their entire respective lengths.

Figure 2:
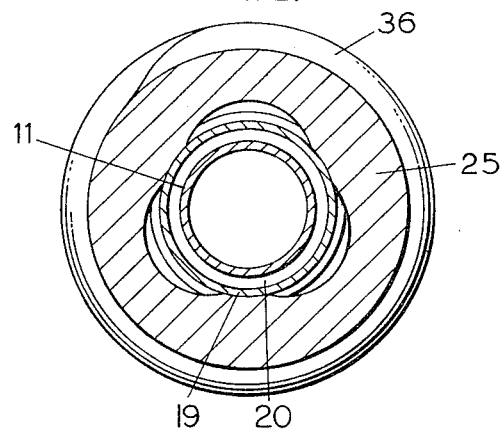
FIGURE 2 is a cross-section taken on the line II—II of FIGURE 1.

A terminal portion of the inner sheath protruding beyond the extension piece 19 has attached thereto by means of a channelled annular connecting piece 23 a hood 24 which enshrouds the extension piece like a skirt and at its end inwardly of the fuel pin carries a fitting 25 which is also to be seen in FIGURE 2. This fittting engages the extension piece 19 at circumferentially equispaced locations to provide transverse location for the hood and between these points of engagement affords an opening for coolant entry. Such hood serves to form with the vent clearance 20 what is known as a lute or diving bell gas trap. Its provision is especially necessary where the pins have the vent clearance at the top as distinct from the bottom, this being the case in the example under consideration. The length of the hood should be such that the distance between the coolant entry opening afforded by the fitting 25 and the top of the extension piece 19 gives, when taken in conjunction with the radial spacing of the hood from the extension piece, a sufficient volume to ensure that the level of coolant in the hood cannot reach the clearance 20 under any credible reactor condition; the conditions likely to cause greatest rise of level are the pressurisation of the coolant, in the case where the hood entry opening is in a position of relatively high coolant pressure, and the contraction of the gas content of the fuel pin when the reactor core cools on shut down. The hooded tubular fuel pin therefore prevents coolant sodium from coming into contact with the fuel material.

The illustrated vented tubular fuel pin construction enables the pins in an assembly to be so closely pitched that the spacing apart of the pins is conveniently accomplished by ribbing on the outer sheaths rather than by separate spacer grid structures. The ribbing may be continuous or discontinuous. Preferably there is on the outer sheath of each pin a single continuous rib. It becomes possible to realise fuel volume fractions approaching 50% which are of advantage for high breeding ratios in the core.

Figure 4:
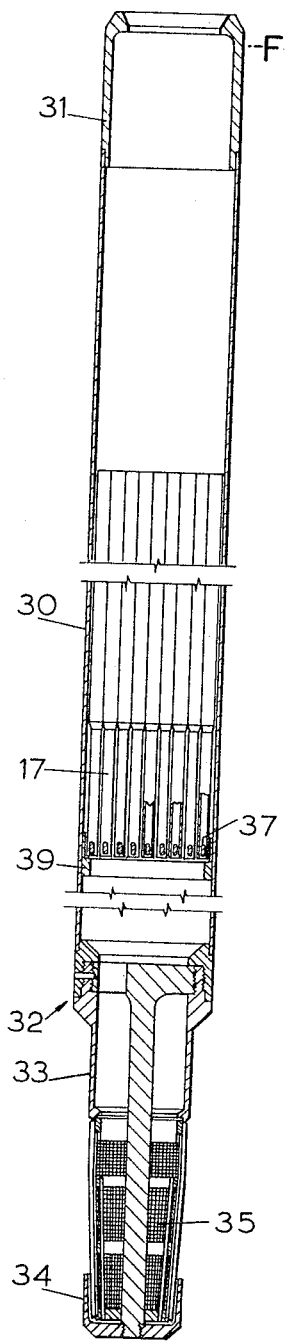
FIGURE 4 is a view in longitudinal section of a reactor fuel assembly comprising fuel pins as illustrated in the previous figures.

In the fuel assembly as seen in FIGURE 4, a cluster of the fuel pins tightly packed on a triangular lattice is carried within a stainless steel hexagonal wrapper 30 which is open at the top end through a top fitting 31 and at the lower end has a bottom fitting 32 having spaced cylindrical bearing surfaces 33 and 34 for fitting into a socket of a core support structure. Between the bearing surfaces 33 and 34 there is a stainless steel knitmesh filter 35 which enables coolant from an inlet plenum incorporated in the core support structure to enter into the bottom of the wrapper 30 and hence flow upwards through the fuel pin cluster to the open top end of the assembly. The continuous rib, by which spacing in the cluster is maintained, is formed by a wire 36 (FIGURE 1) which is wrapped in a helix around each of the fuel pins. The helix has a long pitch so that the spacer wires of adjacent pins in the cluster abut the opposite outer sheath. The fuel pins are supported only at their lower ends, such support being by means of parallel bars, such as 37, which pass through slots 38 (FIGURE 1) in the locating tubes 17. The bars 37 are in turn carried by a ring 38 which is riveted to the wrapper 30. It is also within the scope of the invention that the vent clearance need not be the only vent path for gases released from the fuel; in fact it may be desired that there is an escape route through which the gases will be vented in preference to the clearance. For this purpose the clearance should be minimal and the sheath termination is therefore lightly engaged uninterruptedly with the other sheath, as by a sliding fit of the one on the other, and a further vent path to a lower pressure region is provided. Such an arrangement may be used where it is desirable that the gases are taken off at the cooler inlet end of the core but do not actually enter the coolant at this end so as to avoid gas bubbles in the core. The preferred vent path may then extend from a gas collection chamber in the rod at the inlet end of the core to an outlet situated either at the outlet end of the core or in some other region of lower pressure than the inlet coolant, for example, the low pressure coolant reservoir which is to be found beneath the core support structure where hydraulic hold down of the fuel assemblies in the core is employed.

What we claim is:

1. In a tubular nuclear fuel rod having inner and outer sheaths with nuclear fuel contained between them, the combination comprising an edge adjacent one end of one of the sheaths, said edge presenting a surface unconnected with and generally conforming in shape to an opposing wall surface of said other sheath to define between the edge surface and the opposing wall surface a clearance which is narrower than the separation between the sheaths where the fuel is disposed and which provides a vent path to the exterior of the fuel rod for gases released from the fuel, and means fixing the sheaths rigidly together, said means being in only one region of the rod remote from said edge whereby to allow differential thermal expansion of the sheaths in the axial direction of the rod.

2. The combination as set forth in claim 1, wherein said edge is at a free end of an extension piece having at the other end a flange-like connection to the associated sheath, the extension piece being over substantially its full length of a uniform tubular section having dimensions adapted to form the clearance in conjunction with said other sheath.

3. The combination as set forth in claim 2, wherein the sheaths are coaxial cylindrical tubes, the tubular section of the sheath with the clearance-defining edge being uniform over at least the fuel-containing length of the rod and that of the other sheath being uniform over at least the fuel-containing length plus the length where the clearance is defined.

4. The combination as set forth in claim 1 and further comprising a hood enshrouding an end length of the rod including the clearance-defining edge, the hood defining a coolant entry situated further towards the opposite end of the rod than said clearance and thereby forming a gas trap for preventing coolant reaching the clearance.

5. The combination as set forth in claim 1, wherein the clearance is sealed with a thermally destructible seal adapted to be removed by heating of the rod in service.

6. The combination as set forth in claim 1, wherein is provided a vent path supplementary to the clearance.

No references cited.

CARL D. QUARFORTH, *Primary Examiner.*

M. J. SCOLNICK, *Assistant Examiner.*